Figure 5:
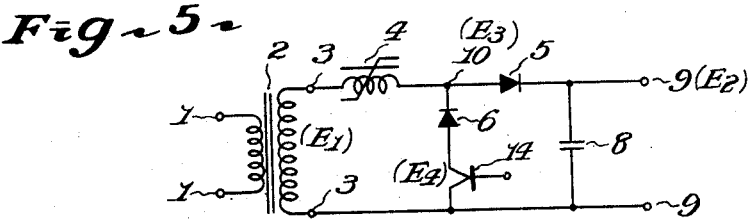

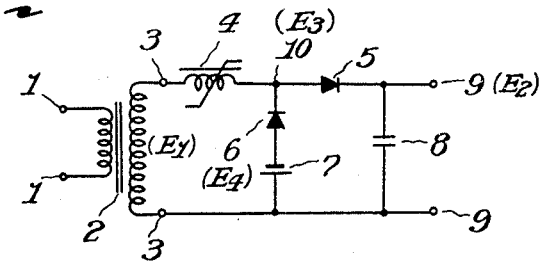
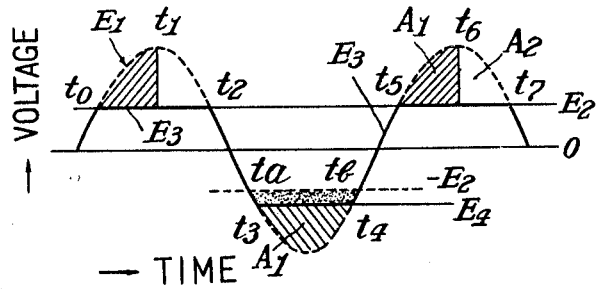
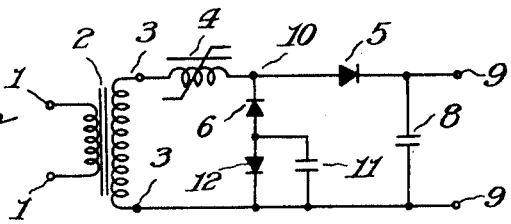
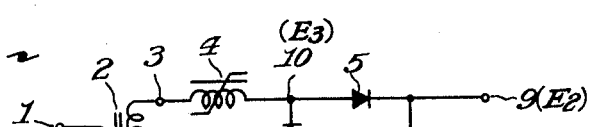
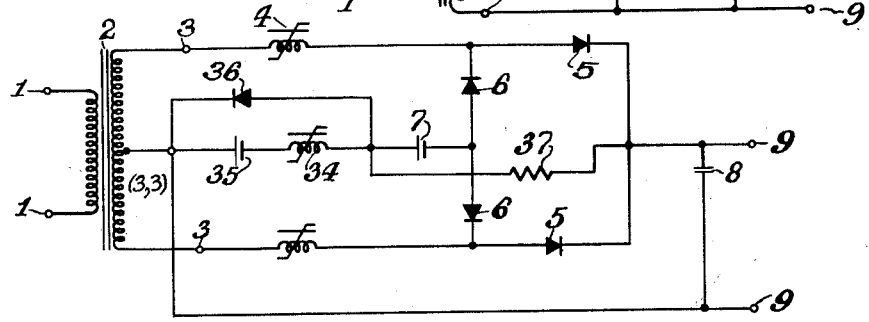

Fig-9-
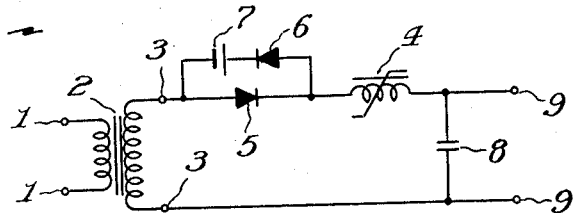
Fig-10-
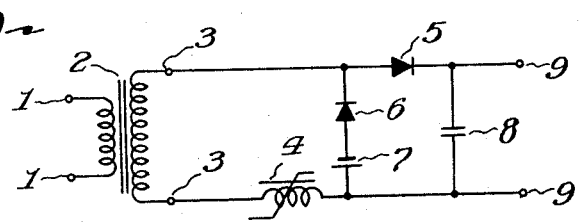
Fig-11-
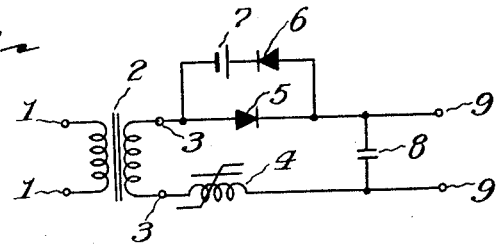
Fig-12-
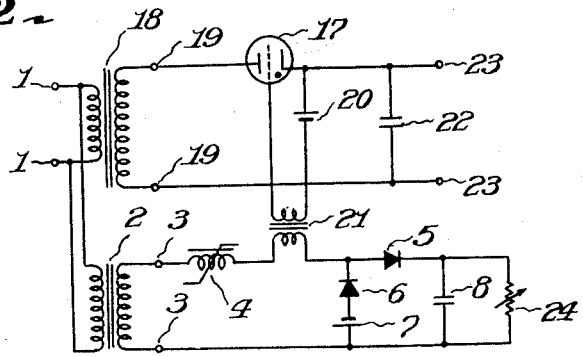

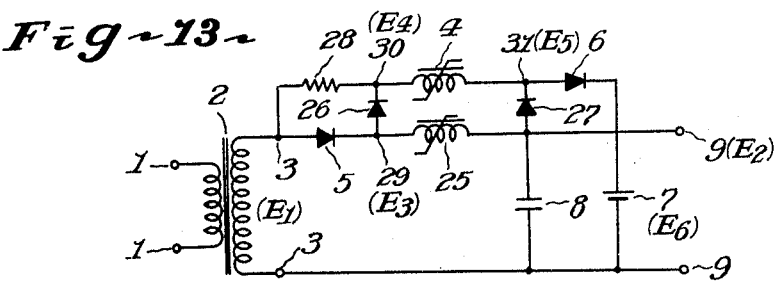
Fig-13-
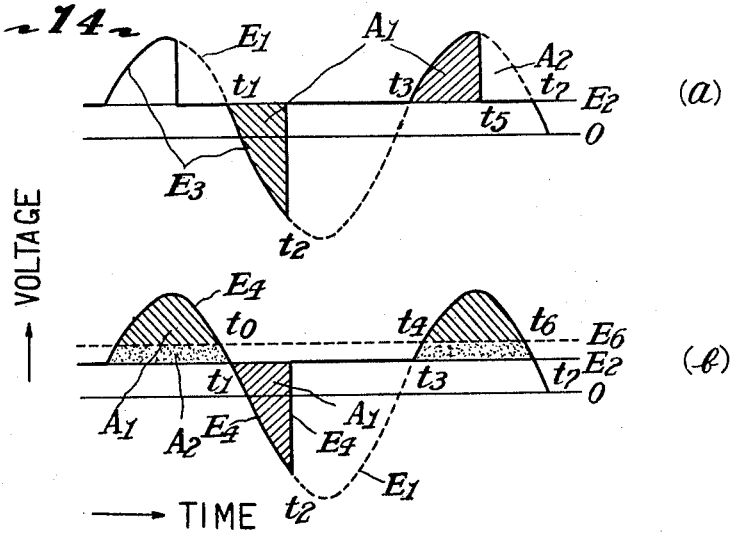
Fig-14-
(a)
(b)
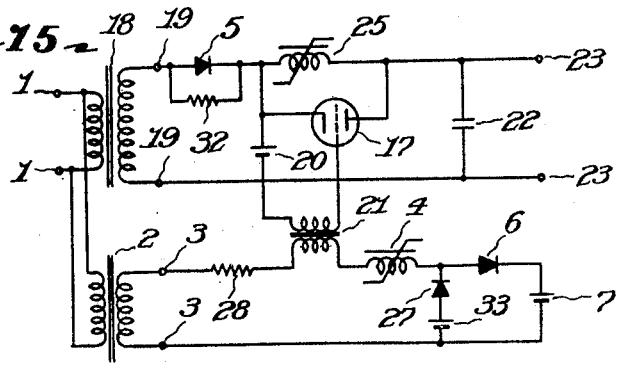
Fig-15-

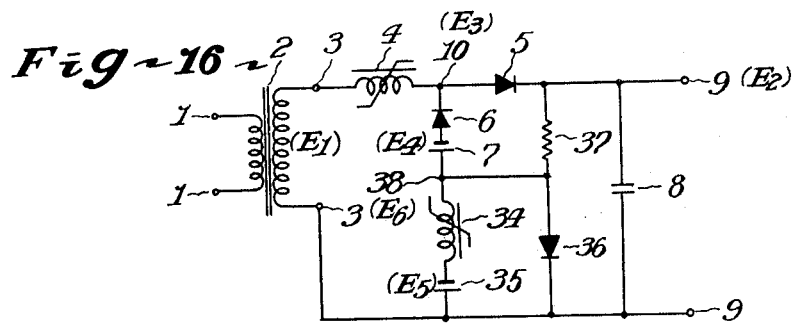
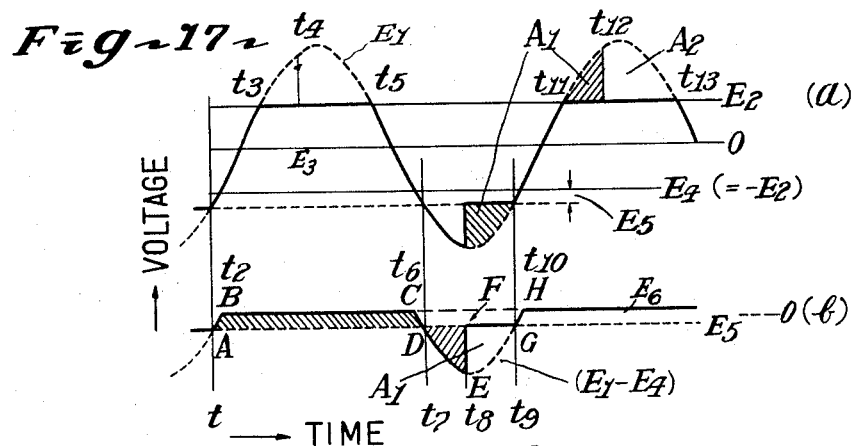
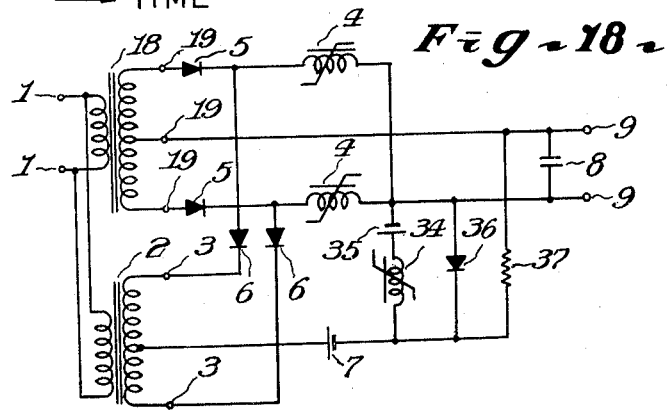

United States Patent Office 3,141,125
Patented July 14, 1964

3,141,125
RECTIFYING APPARATUS SYSTEM FOR CONTROLLED RECTIFIED OUTPUT WHEREIN THE CONTROL ELEMENTS ARE CONNECTED IN A RING FORMATION
Toshio Kurimura and Kazuomi Yamamura, Tokyo-to, Japan, assignors to Kokusai Denshin Denwa Kabushiki Kaisha, Tokyo-to, Japan, a joint-stock company of Japan
Filed Sept. 18, 1961, Ser. No. 138,696
Claims priority, application Japan Sept. 30, 1960
4 Claims. (Cl. 321—25)

This invention relates to rectifying apparatuses of variable output, and more particularly it relates to a new rectified output controlling system wherein the current-controlling element, such as a saturable reactor, thyratron, or silicon-controlled rectifier (SCR), which is used in the rectifying circuit of a variable-output rectifying apparatus is controlled by means of a control circuit wherein a rectifying element, an alternating-current power source, a direct-current power source, and saturable reactor or reactors are connected in ring formation or loop configuration.

As a typical example of a conventional control system of this type, a system wherein a saturable reactor of single-winding type is used for the current-controlling element in the rectifying circuit may be considered. One terminal of this saturable reactor is connected to a smoothing condenser of the output circuit, and the other terminal is connected to a rectifier and a vacuum tube which controls the voltage imparted on the saturable reactor when said rectifier is in a cut-off or non-conductive condition. Then, this saturable reactor, during the said cut-off period of the rectifier, is magnetized to a necessary value toward the unsaturated condition by the difference between the output voltage and the plate voltage of the aforesaid vacuum tube and, successively during the conductive period of the aforesaid rectifier, it suppresses the rectified current in accordance with the degree of the above-mentioned magnetization, thereby controlling the output to a certain value. However, in the case wherein fluctuations occur in the input alternating-current voltage supplied to the rectifying circuit, this control system has the disadvantage of being unable to maintain the rectified output in a stable condition.

That is, in order to maintain the rectified output in a stable condition, it is necessary to vary the operating angle of the rectified current in accordance with the fluctuation of the input alternating-current voltage. For this purpose, it is necessary to vary the degree of magnetization of the saturable reactor over a wide range. In the case of this type of control system, however, the degree of magnetization of the saturable reactor has almost no correlation with the input alternating-current voltage, and the said degree of magnetization will not vary unless some stabilization measure is taken in connection with the aforementioned voltage-control circuit. Accordingly, the rectified output fluctuates over a wide range.

The conventional form of this stabilization measure has been to add an apparatus (negative feedback circuit) which accomplishes such functions as taking out the quantity of variation of the output voltage; amplifying the same to the necessary degree; then impressing the same on the aforesaid voltage-control circuit to create the necessary control voltage; and, when the rectified output tends to increase as a result of this, magnetizing the saturable reactor so as to reduce this tendency, thereby stabilizing the output voltage. In this case, however, since the rectified output circuit, in which the quantity of variation of the output voltage is taken out, generally forms a low pass filter, it causes a time lag in the quantity of variation of the output voltage. Furthermore, since a time lag which is related to the period of the alternating-current power source exists also in the control action of the saturable reactor, the operation of such a negative feedback circuit as described above in a stable manner and, moreover, at high speed would entail the disadvantages of extreme complication of circuit and high price.

It is an essential object of the present invention to provide a new system for controlling rectified output by means of which, in a variable-output rectifying apparatus, it is possible to obtain a stable output regardless of fluctuations in the input alternating-current voltage without the use of a special output stabilization measure such as, for example, a stabilization system effecting negative feedback.

Accordingly, by the use of this system, it is possible to compose a simple, constant-voltage rectifying apparatus, regardless of the magnitude of the electric power capacity, without the use of a feedback circuit such as is generally used.

The afore-stated object, other objects, and advantages have been achieved by the system of this invention, which, summarily stated, has the following special features.

In the circuit apparatus according to the present system, the current-control element of a rectifying circuit is controlled through the utilization of the phenomenon whereby the impedance of a saturable reactor which consists of a single winding about a core having characteristics approaching those representable by a B-H loop of rectangular shape is caused to vary remarkably by the saturated and unsaturated conditions of the magnetic flux of the core. The said saturable reactor is connected in ring formation with a rectifying element, an alternating-current power source, and a direct-current power source of low capacity to compose a control circuit. The rectified output is controlled by increasing or decreasing the voltage of the said direct-current power source. In the case wherein the input alternating-current voltage impressed on the rectifying circuit fluctuates, the aforesaid alternating-current power source is varied by the same proportion as this fluctuation of the alternating-current voltage in order to maintain the rectified output in a stable state. It is possible to use the aforesaid saturable reactor also for the additional function as a current-control element of the rectifying circuit. It is also possible to insert a circuit wherein a second saturable reactor and a second direct-current power source are connected in series, as a second control circuit, in the aforesaid control circuit connected in ring formation.

The manner in which the objects and accompanying advantages of the invention may be best achieved will be more clearly apparent by reference to the following detailed description taken in conjunction with accompanying illustrations in which the same and equivalent parts are designated by the same reference numerals and letters, and in which:

FIGURES 1, 3, 4, 5, 6, 7, 9, 10, 11, 12, 13, 15, 16, 18, and 19 are electrical circuit diagrams indicating embodiments of the system according to the invention; and FIGURES 2, 8, 14, and 17 are wave-form diagrams of voltage versus time, illustrating the principle of the present invention.

FIG. 1 shows an example of a fundamental circuit embodying the present invention and indicates the case of half-wave rectification. In the case of single-phase full-wave rectifier and polyphase rectifier, the same circuit may be used for each phase. The alternating-current power source (not shown) is connected to input terminals 1 of the apparatus, whereby the necessary voltage is imparted to a rectifying circuit from output terminals 3 of a transformer 2. A saturable reactor 4, together with a rectifying element 5 and a condenser 8, forms the rectifying circuit and, at the same time, forms a control circuit connected in ring formation together with a rectifying element 6 of low capacity, a direct-current power source 7 of low capacity, and output terminals 3 as an alternating-current power source, whereby the degree of magnetization of the saturable reactor 4 itself is controlled. Terminals 9 connected to the condenser 8 are provided as the output terminals of the apparatus, and variable rectified output is obtained from these terminals.

The voltage wave-form diagram of FIG. 2 graphically indicates the operation of the circuit shown in FIG. 1. The curve designated by $E_1$ represents the voltage wave form at the output terminals 3 of the transformer 2, and some portions of this curve coincide with the solid-line wave form $E_3$. In order to simplify description, the voltage at the output terminals 9 will be considered for the case wherein the capacity of the condenser 8 is amply large, in which case the said voltage can be represented by a voltage wave form $E_2$ which is substantially level. The thick line $E_3$ represents the wave form of the voltage at terminal 10 of the saturable reactor 4 in the case wherein the normal-direction voltages of the rectifying element 5 and the rectifying element 6 are neglected. The solid line $E_4$ represents the voltage of the direct-current power source of low capacity.

The operation of the circuit of FIG. 1 will now be described with reference to FIG. 2. Referring to FIG. 2, in the time interval $t_0$–$t_1$, since $E_1$ is greater than $E_2$, the rectifying element 5 is conductive. However, the saturable reactor 4 is in an unsaturated condition and, as it generates counter electromotive force corresponding to the portion shaded by lines sloping upwardly to the right in the diagram, suppresses the rectified current until time $t_1$ is reached. At the time $t_1$, the saturable reactor 4 reaches its saturated condition, and its counter electromotive force is reduced to zero. Accordingly, thereafter until time $t_2$, the condenser 8 is charged with rectified current.

During the above-described period $t_0$–$t_2$, since the rectifying element 5 is conductive, the voltage $E_3$ at the terminal 10 becomes equal to the voltage $E_2$ of the condenser 8. During the period $t_2$–$t_3$, since counter electromotive force is imparted to the rectifying elements 5 and 6, and they are in a cut-off condition, $E_3$ varies by following up $E_1$, and the saturable reactor 4 is maintained in its saturated condition up to time $t_3$. After the time $t_3$, when $E_1$ becomes lower than $E_4$, the rectifying element 6 becomes conductive. Accordingly, $E_3$ becomes equal to $E_4$, and the saturable reactor 4 is magnetized from its saturated value to an unsaturated condition in proportion to the area $A_1$, which is shaded by lines sloping downwardly to the right in the diagram. (Hereinafter, this operation of magnetization to the unsaturated state will be called resetting.)

In the time interval $t_4$–$t_5$, an operation similar to that of the interval $t_2$–$t_3$ occurs, and the saturable reactor 4 is maintained in its unsaturated condition until time $t_5$ is reached. After the time $t_5$, the operation subsequent to time $t_0$ is repeated. That is, after $t_5$, the saturable reactor 4 undergoes a magnetic flux variation which is equal to that during the interval $t_3$–$t_4$, after which time $t_6$ is reached, and the reactor 4 becomes saturated. Accordingly, from the characteristic of the saturable reactor, it is apparent that the area of the portion shaded by lines sloping downwardly to the right in the interval $t_3$–$t_4$ is equal to the area of the portion shaded by lines sloping upwardly to the right in the time interval $t_5$–$t_6$.

In the time interval $t_6$–$t_7$, rectified current is supplied to the condenser 8, and the quantity of electricity Q has the following relation with the area $A_2$ of the portion enclosed by $E_1$ and $E_2$ in the interval $t_6$–$t_7$.

$$Q = A_2/R$$

where R is the value of resistance of the rectifying circuit including such resistances as the winding resistance of the transformer 2, the winding resistance of the saturable reactor 4, and the resistance in the normal direction of the rectifying element 5.

Since, as is apparent from FIG. 2, the area of the portion wherein, in the interval $t_a$–$t_b$, $E_1$ exceeds $-E_2$ is equal to the area of the portion wherein, in the interval $t_5$–$t_7$, $E_1$ exceeds $E_2$, the area $A_2$ of the interval $t_6$–$t_7$ is equal to the area of the portion shaded by dots in the interval $t_a$–$t_b$. Accordingly, it is possible, by varying $E_4$, to vary the rectified output substantially in proportion to the quantity ($|E_4|-E_2$). Therefore, since the area of the said portion shaded by dots does not vary greatly even when the alternating-current voltage $E_1$ fluctuates, the rectified output is maintained in a substantially constant state with respect to fluctuations of the voltage of the alternating-current power source.

FIG. 3 illustrates one example of an embodiment of the invention wherein, in place of the direct-current power source 7 of low capacity of the control circuit connected in ring formation of FIG. 1, the voltage of a circuit wherein a condenser 11 and a constant-voltage diode 12 (Zener diode) are connected in parallel is utilized. In this case, since the condenser 11 is charged by the magnetizing current which flows during the resetting period of the saturable reactor, its terminal voltage rises, but when this voltage reaches a certain voltage value determined by the constant-voltage diode 12 which is connected in parallel with the said condenser, the constant-voltage diode begins to cause the flow of a discharge current, whereby the said terminal voltage stabilizes at a certain voltage. Accordingly, the operation of this circuit may be described similarly as in the case of the circuit of FIG. 1 if the voltage of the constant-voltage diode is considered as the voltage $E_4$ of FIG. 2.

FIG. 4 illustrates an example of another modification of the embodiment of FIG. 1, wherein, in place of the direct-current power source of low capacity of the control circuit connected in ring formation, the voltage between the terminals of a variable resistance 13 is utilized. In this case, the resistance value of the variable resistance is made to be equal to the necessary direct-current voltage $E_4$ divided by the magnetization current of the saturable reactor. Under this condition, current flows in the control circuit in the region of FIG. 2 where $E_1$ is less than zero, but while $E_1$ is still less than $E_4$ in magnitude, the said current is less than the magnetization current of the saturable reactor, and resetting is not accomplished. The saturable reactor is reset only when $E_1$ exceeds $E_4$, but since the magnetization current at this time is an almost constant current which, unrelated to the voltage impressed on the saturable reactor, corresponds only to the coercive force of the core, the voltage appearing at the variable resistance 13 is maintained at the value of the voltage $E_4$ which was predetermined. Accordingly, the voltage at the terminal 10 varies similarly as the voltage $E_3$ of FIG. 2, and, by varying the resistance value of the variable resistance 13, it is possible to control the rectified output similarly as in the case of the circuit of FIG. 1.

It will be obvious that the above-mentioned variable resistance 13 may be replaced by a voltage-control element such as a vacuum tube or a transistor. FIG. 5 illustrates an example of an embodiment wherein a transistor 14 is thus used. The resetting of the saturable reactor 4 in this case is controlled by the collector current (magnetization current of the saturable reactor) of the transistor and the collector voltage determined by the base current. If this voltage is considered to be equivalent to the voltage $E_4$ of FIG. 2, the operation of this embodiment may be considered to be the same as that of the circuit of FIG. 1.

Figure 6:
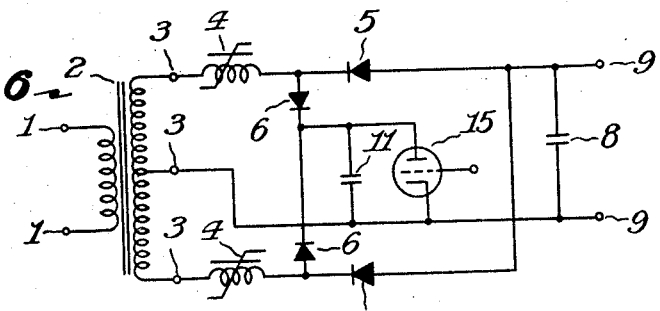

FIG. 6 illustrates an example of an embodiment wherein, in place of a direct-current power source of low capacity of the control circuit connected in ring formation, the voltage of a circuit wherein a condenser 11 and a vacuum tube 15 which controls the voltage of this condenser 11 are connected in parallel is utilized. In this circuit, the circuit of FIG. 1 is applied to full-wave rectification circuit, and the operation of each rectification circuit is the same as that of the circuit of FIG. 1. The only difference is that, since the portion of the direct-current power source 11 and 15 of the control circuit is common to both said rectification circuits, the magnetization currents of two saturable reactors 4 flow alternately in these circuits. Although these magnetization currents cause the voltage of the condenser 11 to rise, if the discharge current of the vacuum tube 15 is caused to be a suitable value, it will be possible to stabilize the voltage of the condenser at the necessary value and thereby to control the rectified output.

Figure 7:
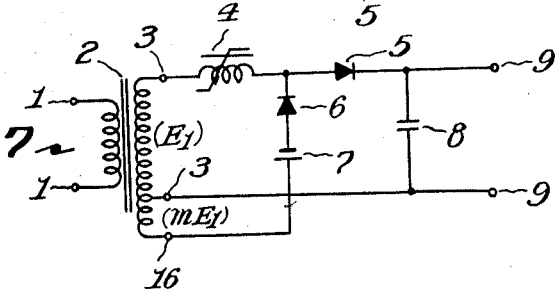

FIG. 7 illustrates an example of a circuit wherein the alternating-current voltage of the control circuit connected in ring formation is caused to be $(1+m)$ times the alternating-current voltage $E_1$ of the rectifying circuit. For this purpose an output terminal 16 is newly provided in the secondary winding of the transformer 2.

Figure 8:
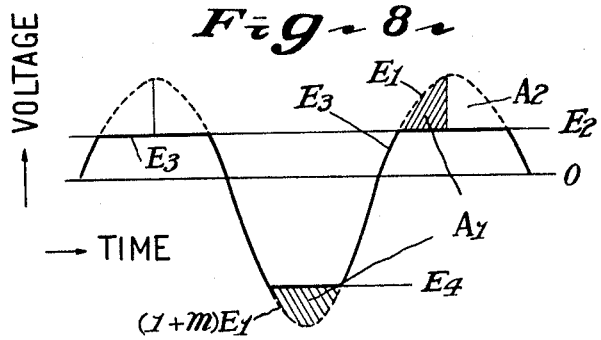

The operation of the circuit of FIG. 7 may be described by means of the voltage wave form diagram shown in FIG. 8. Since the voltage wave form $E_1$ is related to only the rectifying circuit, its negative portion is omitted; and, since the voltage wave form $(1+m)E_1$ is related to only the resetting, its positive portion is omitted. The operation of a circuit with these relations is somewhat different from that of the case shown in FIG. 2. That is, in the case of FIG. 2, since the area of the portion shade with dots increases (although slightly) with increase of the alternating-current voltage, the area $A_2$ corresponding to the accomplishment of rectification increases. Consequently, the rectified output cannot be maintained in a completely unvarying manner. With the relations represented in FIG. 8, however, in the case wherein the alternating-current voltage is caused to increase, there is developed a portion wherein the amount of increase of the area $(=A_1+A_2)$ of the portion in which $E_1$ exceeds $E_2$ and the amount of increase of the area $(=A_1)$ of the portion in which $(1+m)E_1$ exceeds $E_4$ are equal or are very close to one another. Accordingly, in this case, since the variation of the area $A_2$ becomes zero or extremely small, it is possible to maintain the rectified output approximately constant within a special range of fluctuation of the alternating-current voltage.

FIGS. 9, 10, and 11 illustrate other examples of modifications of the circuit shown in FIG. 1, and their operations are the same as that of the circuit of FIG. 1.

FIG. 12 illustrates one example of a circuit wherein a control circuit connected in ring formation is used to control a thyratron 17 of the rectifying circuit. A transformer 18, a thyratron 17, and a condenser 22 form the rectifying circuit, and the said thyratron 17 is controlled by the output of a pulse transformer 21 which is newly inserted in the control circuit connected in ring formation. In this case, the operation of the control circuit is exactly the same as that in the case shown in FIG. 1. When the saturable reactor 4 reaches its saturated state according to the relations indicated in FIG. 2, a charging current rapidly begins to flow to the condenser 8. Accordingly, this current variation causes a pulse to be generated by the pulse transformer 21 to cause the thyratron 17 to become conductive. As will be apparent from the foregoing description, if a variable resistance 24 as shown is so adjusted as to cause the ratio of the alternating-current voltage impressed on the rectifying circuit to the alternating-current voltage impressed on the control circuit to become equal to the ratio of the voltage of a condenser 22 as shown in the rectifying circuit to the voltage of the condenser 8 added to the control circuit, the operations of the rectifying circuit and the control circuit will become completely similar, and the example circuit of FIG. 12 will, in actuality, have the same characteristics as that shown in FIG. 1.

FIG. 13 illustrates an example of a circuit wherein a control circuit connected in ring formation is used to control a saturable reactor 25 of the rectifying circuit. This rectifying circuit is composed of a transformer 2, a rectifying element 5, a saturable reactor 25, and a condenser 8 and is coupled to the control circuit by coupling diodes 26 and 27.

The operation of the circuit of FIG. 13 may be explained by reference to the voltage wave form diagram shown in FIG. 14. The various voltages are designated as follows: the voltage at the output terminals 3 of the transformer 2 by $E_1$; the voltage at the output terminals 9 by $E_2$; the voltage at the junction 29 by $E_3$; the voltage at the junction 30 by $E_4$; the voltage at the junction 31 by $E_5$; and the voltage of the direct-current power source 7 by $E_6$. The operation of the control circuit will be described first with reference to FIG. 14(b). At a time instant $t_0$, the resetting of the saturable reactor 4 is completed. Thereafter, up to the time $t_1$, both the rectifying element 6 and the coupling diode 27 are in a cut-off or non-conductive state. At the time $t_1$ and thereafter, since $E_2$ becomes greater than $E_1$, the coupling diode 27 becomes conductive, and a voltage corresponding to the portion shaded by lines sloping upwardly to the right is impressed on the saturable reactor 4. Since a resistance 28 for limiting current in this case is so selected that the drop in voltage due to the magnetization current may be neglected, the voltage $E_4$ at the junction 30 follows up the voltage $E_1$. When a time $t_2$ is reached, the saturable reactor 4 reaches its saturated state and abruptly loses counter electromotive force, whereby $E_4$ abruptly changes to $E_2$. At this time, the resistance 28 for limiting current prevents excessive current from flowing through the saturable reactor 4. This condition continues until a time $t_3$. The time interval $t_3$–$t_4$ is the same as the interval $t_0$–$t_1$. At the $t_4$ and thereafter, since $E_1$ becomes greater than $E_6$, the rectifying element 6 becomes conductive, and the saturable reactor 4 is reset by a voltage represented by the portion shaded by lines sloping downwardly to the right. At a time $t_6$ and thereafter, the above-described operation is repeated.

The operation of the rectifying circuit will now be described with reference to FIG. 14(a). At the time $t_1$, the saturable reactor 25 is in its saturated state. After the $t_1$, $E_1$ becomes less than $E_2$, and the rectifying element 5 is placed in a cut-off or non-conductive state. However, since the voltage $E_4$ indicated in FIG. 14(b) is following up the voltage $E_1$, the coupling diode 26 becomes conductive, and the voltage $E_3$ follows up $E_1$. Accordingly, the saturable reactor 25 undergoes resetting corresponding to the portion shaded by lines sloping downwardly to the right in FIG. 14(a). After a $t_2$ and up to a $t_3$, no voltage is impressed on the saturable reactor 25. After the $t_3$, $E_1$ becomes greater than $E_2$, the rectifying element 5 becomes conductive, and the saturable reactor 25 suppresses the rectified current until a time $t_5$ is reached. During the time interval $t_5$–$t_7$, since the saturable reactor 25 is in its saturated condition, rectification is accomplished. As will be apparent from the above-described relationships, since the area of the portion shaded by dots in FIG. 14(b) and the area $A_2$ in the interval $t_5$–$t_7$ indicated in FIG. 14(a) are equal, the operation of the example circuit of FIG. 13, in effect, has the same characteristics as the operation of the circuit of FIG. 1.

FIG. 15 illustrates an example of a circuit wherein the control circuit connected in ring formation and the saturable reactor 25 of the rectifying circuit are coupled through the use of a pulse transformer 21 and a thyratron 17. The operation of the control circuit in this case is accomplished with the same relationships as shown in FIG. 14(b) by the mere addition, newly, of a direct-current power source 33. Accordingly, when the saturable reactor 4 reaches its saturated state, and the current of the control circuit changes abruptly, a pulse is generated in the pulse transformer 21 and causes the thyratron 17 to become conductive. Until this time, the saturable reactor 25, through a resistance 32 for resetting, is being reset, in the interval during which the rectifying element 5 is non-conductive, with the same relationships as those shown in FIG. 14(a). However, this resetting is ended by the thyratron becoming conductive. Accordingly, by causing the ratio between the voltage of the direct-current power source 33 and the voltage of the output terminals 23 of the rectifying circuit to be equal to the ratio between the alternating-current voltage of the control circuit and the alternating-current voltage of the rectifying circuit, the example circuit shown in FIG. 15 can be made to have exactly the same operational characteristics as those of the circuit shown in FIG. 13.

Through the use of the above-described examples of embodiments of the present invention, it is possible to maintain the output stable to a substantial degree with respect to fluctuations of the input alternating-current voltage. However, it is difficult to maintain the output stable over a wide fluctuation range. The reason for this difficulty is that, as was explained in connection with the embodiments already described, the area in each case of the graphical portion shaded with dots, which has a proportional relationship with the rectified output, is caused to vary somewhat by the fluctuation of the alternating-current voltage.

By the utilization of the system described hereinafter, the variation of the area of this portion shaded with dots is cancelled by means of a second control circuit, and, according to the principle utilized, the rectified output can be maintained perfectly stable within a wide range of fluctuation of the input alternating-current voltage.

FIG. 16 illustrates one example of this system wherein a circuit in which, as a second control circuit, a second rectifying element 36 is connected in parallel to a circuit composed of a second saturable reactor 34 connected in series with a second direct-current power source 35 is inserted in the control circuit connected in ring formation, and wherein voltage is impressed by way of a resistance 37 on this second control circuit. The magnetization current of the said second saturable reactor 34 is selected to be lower than the magnetization current of the saturable reactor 4. In this example embodiment, moreover, the saturable reactor 4 of the control circuit functions also as a current control element of the rectifying circuit.

The operation of the circuit of FIG. 16 will now be described below with reference to the voltage wave form diagram shown in FIG. 17, in which FIG. 17(a) is related to the voltage of the first saturable reactor 4, and FIG. 17(b) is related to the voltage of the second saturable reactor 34. In the time interval $t_1$–$t_7$ of FIG. 17(b), since current is supplied from the output circuit through the resistance 37, and the rectifying element 36 is conductive, the voltage $E_6$ at a terminal 38 as shown in FIG. 16 becomes zero. Accordingly, the saturable reactor 34 is subjected by the voltage of the direct-current power source 35 to resetting which corresponds to the portion shaded by lines sloping downwardly to the right. After $t_7$, the voltage $E_1$ becomes less than the sum of the voltages $(E_4+E_5)$, and the rectifying element 6 becomes conductive. Therefore, $E_6$ follows up the wave form of $E_1$ as indicated in FIG. 17(b). Accordingly, the saturable reactor 34 is magnetized toward saturation by a voltage indicated by the portion shaded by lines sloping upwardly to the right. The current which flows at this time through the control circuit is the current of the resistance 37 and the magnetization current of the saturable reactor 34. If this current is predetermined to be lower than the magnetization current of the saturable reactor 4, the saturable reactor 4 will not be magnetized until the time $t_8$ is reached. At time $t_8$, since the saturable reactor 34 reaches saturation, it abruptly loses counter electromotive force, and the voltage $E_6$ becomes equal to $E_5$. Accordingly, in the time interval $t_8$–$t_9$, the saturable reactor 4 is reset by an amount corresponding to the area of the portion shaded with lines sloping downwardly to the right as indicated FIG. 17(a). In FIG. 17(b), after $t_{10}$, the same operation as described hereinbefore is repeated. In the interval $t_5$–$t_8$, in FIG. 17(a), since a current of a magnitude such as would magnetize the saturable reactor 4 does not flow, the voltage $E_3$ follows up $E_1$. In the interval $t_8$–$t_9$, however, since $E_3$ becomes equal to $(E_4+E_5)$ as afore-described, the saturable reactor 4 is reset. The time interval $t_9$–$t_{11}$ is similar to the interval $t_5$–$t_8$. After time $t_{11}$, the rectifying element 5 becomes conductive, $E_3$ becomes equal to $E_2$, and the saturable reactor 4 suppresses the rectifying current corresponding to the portion shaded with lines sloping upwardly to the right and reaches saturation. Rectification is accomplished in the interval $t_{12}$–$t_{13}$. If the area of this portion is denoted by $A_2$, the following relationships will become apparent in FIG. 17. That is, since the areas of the shaded portions in FIG. 17(a) are mutually equal, if each of these areas is denoted by $A_1$, the area of the portion wherein $E_1$ exceeds $E_2$ will be $(A_1+A_2)$. If the voltage $E_4$ is selected to be equal to $-E_2$, the area CDEGHC in FIG. 17(b) will be equal to $(A_1+A_2)$. From this it follows that the area CDEFGHC remaining after removal of the area EFGE, which corresponds to the area $A_1$, is equal to the area $A_2$. Furthermore, since the area DEFD and the area ABCDA are equal, in operational effect, the following relationships are obtained.

$$A_2 = \text{area } CDEFGHC$$
$$= \text{area } ABHGA \text{ (approximately rectangular)}$$
$$= E_5 T$$

where T represents the period of the alternating-current power source. Since, according to the above equation, $A_2$ is determined only by $E_5$, the rectifying output can be controlled by varying $E_5$. Furthermore, since $A_2$ and $E_1$ are not directly related, the rectified output is maintained absolutely unvaryingly even when the alternating-current voltage fluctuates.

FIG. 18 illustrates an example of a circuit wherein the circuit of FIG. 16 has been composed as a full-wave rectifying circuit, and a transformer 2 is used exclusively as the alternating-current power source of the control circuit. Although the second control circuit and the direct-current power source 7 are included commonly in both circuits, the operational characteristics of the rectifying circuit is exactly the same as in the case illustrated in FIG. 16.

In each of the various examples of basic circuits described above, the electric power consumed in the control circuit is extremely low as compared to the power capacity of the rectifying circuit. Accordingly, the loss of this power is almost negligible. It will be apparent, moreover, that by combining in various ways, according to demand, the above-described basic circuits or partial circuits thereof, other embodiments of the present invention can be obtained. For example, in the case of application of the circuit arrangement shown in FIG. 16 to a full-wave rectifying circuit without any modification, a circuit arrangement as shown in FIG. 19, in which the same reference numerals as FIG. 16 are used, is obtained. In this circuit, the one terminal of two circuits, each comprising a series connection of a saturable reactor 4 and a rectifying element 5 are, respectively, connected to the output terminals 3, 3 of the power transformer. The other terminal of the two circuits are connected together at a common junction. An output voltage is obtained between the common junction and a neutral point of the transformer. Operation of this embodiment can be explained in connection with FIGS. 17(a) and (b). That is to say, the operation curves relative to one rectifying means (the saturable reactor 4 and the rectifier 3) connected to one output terminal 3 of the transformer 2 can be illustrated similarly to FIGS. 17(a) and (b), and operation curves relative to the other side of the rectifying means connected to the other output terminal 3 of the transformer 2 have only a phase difference of $\pi$ against the curves illustrated in FIGS. 17(a) and 17(b). The above illustrations relate to the cases wherein a sufficiently large smoothing condenser is connected to output terminals of the rectifying circuit in order to maintain the rectified output voltage $E_2$ at a certain constant value. However, similar control operation can be attained, even when the rectified output voltage varies remarkably, by connecting a chokecoil in series to the smoothing condenser so as to form a chokeinput type smoothing circuit.

Since it is obvious that many changes and modifications can be made in the above described details without departing from the nature and spirit of the invention, it is to be understood that the invention is not to be limited to the details described herein except as set forth in the appended claims.

What is claimed is:

1. A rectifying apparatus capable of producing a constant D.C. voltage and having two D.C. output terminals comprising, alternating current power supply means having two output terminals, rectifying means connected to one of said output terminals of said power supply means comprising a rectifier having two terminals and a first saturable reactor in series, said reactor having a winding connected to one terminal of said rectifier, first regulating means comprising a rectifying element and a first D.C. voltage source in series, one terminal of said rectifying element being connected at a junction between the rectifier and the winding of said first saturable reactor, second regulating means comprising a second D.C. source and a second reactor having a winding connected to said second D.C. source, a rectifying element connected in parallel with said second regulating means, the last mentioned rectifying element having a terminal connected to said first regulating means and having another terminal connected to a terminal of said power supply means, means for supplying a substantially constant direct-current bias connected between said first regulating means and second regulating means whereby a constant output voltage is obtained at said D.C. voltage output terminals, said D.C. output terminals comprising an output connection to the other terminal of the first-mentioned rectifying means and an output connection to the other output terminal of said power supply means.

2. A rectifying apparatus capable of producing a constant D.C. voltage and having two D.C. output terminals comprising, alternating current power supply transformer having two output terminals, rectifying means connected to one of said output terminals of said power supply transformer comprising a rectifier having two terminals and a first saturable reactor in series, said reactor having a winding connected to one terminal of said rectifier, first regulating means comprising a rectifying element and a first D.C. voltage source in series, one terminal of said rectifying element being connected at a junction between the rectifier and the winding of said first saturable reactor, second regulating means comprising a second D.C. source and a second saturable reactor in series therewith, said second reactor having a winding connected to said second D.C. source, a rectifying element connected in parallel with said second regulating element connected in parallel with said second regulating means, the last mentioned rectifying element having a terminal connected to said first regulating means and having another terminal connected to a terminal of said power supply transformer, means for supplying a substantially constant direct-current bias connected between said first regulating means and said second regulating means whereby a constant output voltage is obtained at said D.C. voltage output terminals, said D.C. output terminals comprising an output connection to the other terminal of the first-mentioned rectifying means and an output connection to the other output terminal of said power supply transformer.

3. A rectifying apparatus capable of producing constant D.C. voltages comprising power supply means comprising a first power supply transformer and a second power supply transformer, said first power supply transformer having a primary winding and a secondary winding having two A.C. output terminals, the output of which is to be rectified and a neutral point, said second power supply transformer having a primary winding and a secondary winding having two A.C. output terminals for regulation and a neutral point, rectifying means comprising two series connections each of which comprises a rectifier having two terminals and a saturable reactor having a winding, said reactor winding having one terminal connected to one terminal of said rectifier, connections connecting each of said series connections comprising a respective one of said rectifying means respectively to one of the output terminals of a respective power supply transformer, connections connecting said series connections to each other, a first regulating means comprising two rectifying elements and a direct-current voltage source, said two rectifying elements being connected respectively between one of the connection junctions of the saturable reactor and the rectifier of said rectifying means and of two output terminals of said second power supply transformer, said direct-current voltage source being connected to the neutral point of said second power supply transformer and to an output terminal of said first transformer, a second regulating means comprising a series connection comprising a D.C. source means and a saturable reactor having a winding connected to said D.C. source means of said second regulating means, a rectifying element connected in parallel with said series connection of the second regulating means, the last-mentioned rectifying element having one terminal connected to the other terminal of the direct-current voltage source of said first regulating means and having another terminal connected to the commonly connected terminals of said rectifying means, resistance means connected between the neutral point of the first power supply transformer and the connection junction between the direct-current voltage source of the first regulating means and the second regulating means, whereby constant output voltages are obtained from D.C. output terminals comprising a neutral point of the first power supply means and the commonly connected terminals of said rectifying means.

4. A rectifying apparatus capable of producing constant D.C. voltages comprising, power supply means comprising a transformer having a primary winding and a secondary winding having output terminals for producing A.C. to be rectified and a neutral point, rectifying means comprising two series connections each of which comprises a rectifier and a saturable reactor having a winding in series with said rectifier, said series connection comprising end terminals, end terminals of said series connection being connected respectively to one of two output terminals of said power supply transformer, the other terminals of said series connection being connected commonly to each other, a first regulating means comprising two rectifying elements and a D.C. voltage source for producing a D.C. voltage at terminals thereof, said two rectifying elements being connected in series in opposite forward-directions, two ends, of said two series connected rectifying elements being connected respectively at connection junctions between the saturable reactor and the rectifier of said rectifying means, and one terminal of said D.C. voltage source being connected to the connection junction of said two rectifying elements, second regulating means comprising, a series connection of a D.C. source means, for producing a D.C. voltage at the terminals thereof and a saturable reactor having a winding whose one terminal is connected to one terminal of said D.C. source means of said second regulating means, a rectifying element connected in parallel with said series connection of the second regulating means, the last-mentioned rectifying element having one terminal connected to the other free terminal of said first regulating means, and another terminal connected to the neutral point of said secondary winding of said power supply transformer, and a current supply means for supplying a substantially constant direct-current bias connected to the connection junction between said first regulating means and said second regulating means whereby constant D.C. output voltages are obtained at points comprising output terminals comprising said commonly connected rectifying means and the neutral point of the secondary winding of said power supply means.

References Cited in the file of this patent

UNITED STATES PATENTS

| | | |
|---|---|---|
| 2,816,260 | Scorgie | Dec. 10, 1957 |
| 2,896,147 | Huge | July 21, 1959 |
| 2,937,328 | Huge et al. | May 17, 1960 |
| 2,978,628 | Diebold | Apr. 4, 1961 |